US006803083B2

(12) United States Patent
Ensinger

(10) Patent No.: US 6,803,083 B2
(45) Date of Patent: Oct. 12, 2004

(54) COMPOSITE PROFILE CONTAINING SOLID OR HOLLOW PLASTIC PROFILES

(75) Inventor: Wilfried Ensinger, Nufringen (DE)

(73) Assignee: Ensinger Kunststofftechnologie GbR, Nufringen (DE)

(*) Notice: Subject to any disclaimer, the term of this patent is extended or adjusted under 35 U.S.C. 154(b) by 0 days.

(21) Appl. No.: 10/177,827

(22) Filed: Jun. 21, 2002

(65) Prior Publication Data

US 2003/0035910 A1 Feb. 20, 2003

Related U.S. Application Data

(63) Continuation of application No. PCT/EP00/07820, filed on Aug. 11, 2000.

(30) Foreign Application Priority Data

Dec. 24, 1999 (DE) ........................................ 199 62 964

(51) Int. Cl.[7] ............................ B32B 5/18; B32B 3/26; B32B 5/20; E04C 1/00; E04C 3/30

(52) U.S. Cl. .................. 428/36.5; 428/188; 428/314.4; 428/318.8; 428/315.7; 428/318.6; 428/315.9; 428/317.9; 52/730.4; 52/309.9; 52/793.1

(58) Field of Search ............................... 428/36.5, 188, 428/314.4, 318.8, 315.7, 318.6, 315.9, 317.9; 52/703.4, 309.9, 793.1, 730.4

(56) References Cited

U.S. PATENT DOCUMENTS 3,764,642 A * 10/1973 Boutillier .................. 264/45.5
4,383,812 A 5/1983 Calcagni
5,527,573 A * 6/1996 Park et al. ............... 428/314.8
5,945,048 A 8/1999 Ensinger
6,276,915 B1 8/2001 Merziger et al.
6,323,251 B1 * 11/2001 Perez et al. ................. 521/134
6,355,341 B1 * 3/2002 Chaudhary et al. ...... 428/314.8

FOREIGN PATENT DOCUMENTS

DE 3203631 A1 8/1983
DE 3227509 A1 1/1984
DE 3801564 A 8/1989
DE 4331816 C 3/1995
DE 19510944 C 10/1996
EP 0028775 A1 5/1981
EP 0899078 A1 3/1999
JP 03240515 A 10/1991
JP 11138615 A 5/1999

OTHER PUBLICATIONS

Patent Abstracts of Japan, vol. 016, No. 030 (M–1203) (Jan. 24, 1992) (JP 03–240515 A abstract).

* cited by examiner

*Primary Examiner*—Harold Pyon
*Assistant Examiner*—Chris Bruenjes
(74) *Attorney, Agent, or Firm*—Leydig, Voit & Mayer Ltd.

(57) ABSTRACT

The invention presents a composite profile for use in the production of windows, doors, facade elements or the like, having inner and outer metallic profiles spaced at a specific distance from each other by a plastic profile. The invention further proposes that the plastic profile contain a surface of a solid, non-porous first plastics material, in a core region, a fine-pored cellular structure of a second plastics material. Additionally, the plastic profile may either be a solid, multilayer profile or a hollow profile. Such plastics profiles are particularly adapted to absorb tensile, bending and/or pressure loads.

23 Claims, 3 Drawing Sheets

COMPOSITE PROFILE CONTAINING SOLID OR HOLLOW PLASTIC PROFILES

"This application is a continuation of application number PCT/EP00/07820 filed Aug. 11, 2000.

BACKGROUND OF THE INVENTION

The invention relates to plastic solid or hollow plastics profiles intended, in particular, to absorb tensile, bending and/or pressure loads, such as are used, in particular, as insulating segments in composite profiles comprising metallic profiled elements.

Known profiles of this type are disclosed, for example, in DE 32 03 631 A1 or DE 38 01 564 A1 and serve as heat-insulating profiles located between metallic profiled elements and are made of high-strength plastics material having poor thermal-conduction properties, for example, a fiberglass-reinforced polyamide. These composite profiles are primarily used in the production of window or facade elements.

These composite profiles and consequently the solid or hollow profiles of plastics material are exposed to considerable influences, for example, wind stresses, perpendicular loads, particularly those caused by the weight of the window glass, and stresses primarily due to temperature differences between the outer and inner metallic profiled elements of the composite profile. The less change occurring in the plastics material of the insulating profiles under climatic conditions such as temperature and air humidity, the lower the stresses that result at the interface between plastics profile and metallic profile.

Hitherto attempts have been made to influence the expansion characteristics of the plastics materials in a favorable manner, ie to reduce their coefficients of expansion, by using plastics materials having higher filler contents, particularly contents of mineral reinforcing and filling materials, especially glass fibers.

However, higher filler contents produce a number of drawbacks. In addition to increased raw-material costs and the greater weight of the insulating profiles, problems arise in processing the raw material, particularly as regards wear and productivity. Following extrusion and solidification, fiberglass-reinforced plastics materials can exhibit undesirable anisotropies, internal residual stresses, greatly reduced ductility and, in particular, higher heat conductivity than the pure plastics material.

In DE 38 01 564 Al, the attempt is made to reduce the heat conductivity of the insulating profile by incorporating small hollow spheres of glass. However, the technology has its limits, and, in view of the more stringent legislative demands regarding energy saving, likewise imposed by the manufacturers of composite profiles, this technology no longer satisfies requirements in all cases.

SUMMARY OF THE INVENTION

It is an object of the invention to develop the above solid or hollow profile such that the drawbacks described above are reduced as far as possible.

This object is achieved in the aforementioned solid or hollow plastics profile in that it has a surface layer of a solid, non-porous first plastics material and a core region comprising a fine-pored, closed-cell cellular structure of a second plastics material.

The said object is further achieved by a hollow profile, which is characterized by a surface layer of a solid, non-porous first plastics material, a core region comprising a fine-pored, closed-cell cellular structure of a second plastics material, and an inner surface layer defining the hollow chamber and composed of a solid, non-porous third plastics material.

The cellular structure of the core region is a closed-cell structure so that a large number of insulating gas volumes is present in the plastics profile. Optimal heat transfer resistance is thus obtain. The fine-pored and closed-cell properties of the core region are also an important factor, since the mechanical properties will not weaken as the density decreases but will remain largely at a constant value.

The profiles of the invention can be manufactured in a manner similar to that described in DE 32 03 631 C2 and DE 19 510 944 C1. The fine-pored core is obtained by foaming the second plastics material with conventional agents such as liquid $CO_2$, nitrogen or azodicarbonamide.

The restriction of the solid, non-porous first plastics material to the formation of a surface layer around the plastics profile and the use of a core region of a fine-pored cellular structure cause considerable reduction in the overall heat conductivity of the profile. The reduction of the heat conductivity is substantially due to the reduction in density of, ie the gas content in, the core region. This in turn leads to a reduction in the weight of the profile and involves considerable savings of raw material during production of the plastics profile. The possible savings in raw material are up to 60% depending on the wall thickness of the surface layer(s) and the particular application. For given profile dimensions, there is achieved a considerable reduction in weight per meter run with only slight detriment to the rigidity behavior (coefficient of transverse bending).

The profile thickness can be increased, for a given weight per meter run, over that of conventional profiles, and this gives rise to considerably higher rigidity or bending strength of the plastics profile. Surprisingly, only a slight increase in the wall thickness can result in, say, twice the coefficient of transverse bending, and this is particularly due to the use, in the core region, of fine-pored structures whose mechanical properties are not linearly related to density as is commonly encountered with freely foamed, large-pored cellular structures of the prior art.

In order to acquire optimal mechanical properties, particularly strength properties, care should be taken to ensure that the porosity or the cellular structure is uniform across substantially the entire cross-section of the core region. In particular, it is important to keep the cell size within a specific range, for example, that recommended below, and to avoid the occurrence of coarser cells at discrete points of the cross-section.

In the case of hollow chamber profiles having an inner surface layer of solid plastics material, the structure of the profile will preferably be such that the core region including its cellular structure will be completely enclosed by the surface layer and the inner surface layer defining the hollow chambers or cavities.

In this case, the surface layer, the core region, and the inner surface layer preferably form a sandwich structure in at least some regions of the profile, said sandwich structure being such that the surface layer, the inner surface layer, and the core region enclosed thereby form layers which are disposed substantially parallel to each other.

The first, second, and third plastics materials used for the production of the profiles of the invention can be the same or different and can contain reinforcing materials, fillers, modifiers, and/or additives. The reinforcing materials may be short, long, and/or continuous fibers, particularly glass, carbon, aramide, or natural fibers. Suitable fillers are glass spheres, hollow glass spheres, wollastonite, mica, and nano-particles.

The group of modifiers includes impact modifiers, ultra-violet heat stabilizers, conductive substances, nucleating agents, coupling agents, etc.

In the case of profiles having a molded-on flange to be engaged by a corresponding groove in the metallic profiles of a heat-insulating compound profile, it is recommended to provide the surface of the flange, at least in certain regions, with a fine-pored coating by, say, co-extrusion. This makes it possible to make the flange somewhat undersize relatively to the groove in the respective metallic profile to be engaged thereby, and the groove walls can be pressed against the flange by a knurling operation so as to deform said fine-pored coating. This produces a particularly good positive fit between the flange of the profile and the groove in the metallic profile.

The average cell size (diameter) of the cellular structure in the core region should, in particular, be in the range of from 0.005 to 0.1 mm, preferably from 0.02 to 0.05 mm. Within these ranges there is achieved an optimum of mass economy without weakening the mechanical properties.

The density of the material in the core region can be up to ca 60% less than that of the raw material.

The plastics materials suitable for use as raw materials in the production of the profiles of the invention, range from thermoplastic and duroplastic to elastomeric plastics materials or mixtures thereof.

Normally, the same raw material will be used for the first, second, and optionally third plastics materials, an approprate procedure being adopted such that the solid surface layer will be formed quasi automatically so that it will not be absolutely necessary to employ a co-extrusion process for the formation of the solid surface layer adjacent the porous core region.

In special cases the core region of the profile of the invention will be composed of a second plastics material differing from the plastics material of the surface layer (first plastics material). This presents the possibility of using a high-grade plastics material for the formation of the surface layer, whilst in the core region a substantially cheaper plastics material can be used. The same applies to the third plastics material.

The profiles of the invention are, for particular applications, completely, or in at least some areas, surface-coated with primers, adhesive coating compositions, and/or conductive lacquers. The profiles of the invention can in this way be prepared for secondary treatment processes such as powder wet coating or anodizing processes.

The profiles of the invention are particularly intended for use as heat-insulating profiles in the production of metal/plastics composite profiles.

The invention finally relates to heat-insulated composite profiles, particularly for use in the manufacture of windows, doors, facades or the like having an inner and an outer metallic profile, which metallic profiles are interconnected by at least one plastics profile of the invention as previously described, by which means said metallic profiles are kept at a specified distance from each other.

These and other advantages of the invention are explained in greater detail below with reference to the drawings.

DETAILED DESCRIPTION OF THE INVENTION

Figure 1:
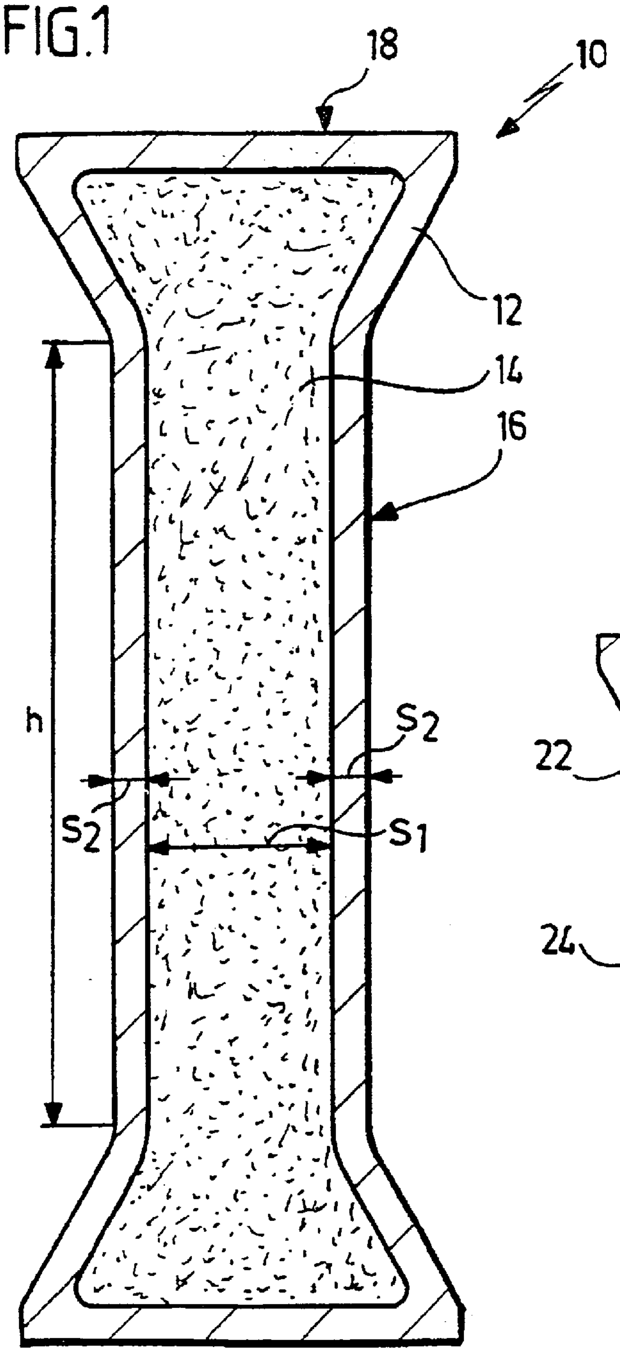
FIG. 1 is a diagrammatic sectional view through a first plastics profile of the invention.

FIG. 1 shows a solid plastics profile generally indicated by the reference numeral 10 and having a surface layer 12 of a compact, non-porous first plastics material and a core region 14 of a fine-pored second plastics material of closed cellular structure.

Viewed in cross-section, the profile itself is composed of a web 16 and a flange 18, which in cross-section has the form of a trapezium.

Flange 18 is shaped such that it can fit into a complementary groove in a metallic profiled element forming part of a composite profile. In its simplest form, the profile 10 usually has another flange in mirror-inverted relationship to flange 18 so that two metallic profiled elements can be interlinked and kept at a distance from each other by profile 10.

In the working example shown in FIG. 1, the thickness $s_1$ of the core region (measured at web 16 ) is 1.76 mm and the wall thickness $S_2$ of the surface layer 12 is approximately uniform over the entire profile 10, ie both in the web region 16 and in the flange region 18, and is, for example, 0.12 mm.

Accordingly the closed-cell, fine-pored core region 14 extends into the trapeziform structure of flange 18.

This imparts certain ductility to the profile, particularly in its flange region 18, this having a noticeable positive effect on the process of straight-knurling the metallic profiled element when forming the groove intended to engage flange 18, in that the straight-knurled regions of the metallic profile can be pressed more readily into the material of flange 18 so that it is easier to achieve a positive fit between said metallic profiled element and said flange 18 of profile 10.

Such design of profile 10 can, in contrast to a solid profile of the same material as the surface layer 12, achieve a considerable reduction in weight accompanied by not more than an insignificant loss of rigidity.

The special advantages of the structure of the hollow profiles of the invention can be specifically discerned from the values of various mechanical parameters listed in Tables I and II. The values apply to a solid profile as shown in FIG. 1 made of polyamide 66 having a short glass fiber content of 25 wt %. The comparative profile has the same outside dimensions but is composed throughout of the same solid, non-porous plastics material as the surface layer 12 of the profile of the invention 10. The values given apply to profiles in an atmosphere of balanced humidity (23° C. and 50% air humidity).

The pore size of the cells in the core region of the profiles of the invention is in the range of from ca 0.02 to 0.05 mm.

The coefficient of transverse bending is stated per mm of web width h and the weight per meter run is given for a web having a width h of ca 20 mm.

Liquid $CO_2$ was used to form the core region.

Table I clearly shows that the profile of the invention can achieve a weight reduction of 28% without suffering from noticeable loss of transverse bending. A loss of only 6.8% is observed.

TABLE I

| | | Example 1 | Comparative Example |
|---|---|---|---|
| Core region 14 (porous) | | + | — |
| Thickness $s_1$ | Mm | 1.76 | — |
| Coefficient of thermal conductivity $\lambda_1$ | W/m*K | 0.14 | — |
| Modulus of elasticity $E_1$ | Mpa | 2700 | — |
| Density $\rho_1$ | g/cm$^3$ | 0.90 | — |
| Surface layer 16 (solid) | | + | Overall profile |
| Thickness $s_2$ | mm | 0.12 | 2.00 |
| Coefficient of thermal conductivity $\lambda_2$ | W/m*K | 0.32 | 0.32 |
| Modulus of elasticity $E_2$ | Mpa | 3000 | 3000 |
| Density $\rho_2$ | g/cm$^3$ | 1.32 | 1.32 |
| Overall profile 10 | | | |
| Total thickness | mm | 2.00 | 2.00 |
| Heat bridge factor s*λ | mm*W/m*K | 0.32 | 0.64 |
| Coefficient or transverse bending E*I | Mpa*mm$^4$ | 1864 | 2000 |
| Weight per meter run | g/m | 38.0 | 52.8 |

Table II shows with reference to Examples 2 to 4 that a slight scale-up (2.50 mm instead of 2.00 mm) of the overall thickness can give rise to a considerable increase (>100%) in the coefficient of transverse bending of the profile of the invention, whilst the profile itself still has a lower weight per meter run than the profile of the comparative example.

extends. However, the core region does not provide the internal surface 38 of the hollow profile, this being formed by a solid material consisting of the first plastics material, of which the (external) surface layer 32 also consists. In this way there is formed in some regions of the profile a kind of sandwich structure comprising an outer surface layer 32, a layer of core material 34, and an inner surface layer 38, all disposed parallel to each other.

Here again, the profile has a web region 40, at the free end of which there is a flange 42.

Figure 3:
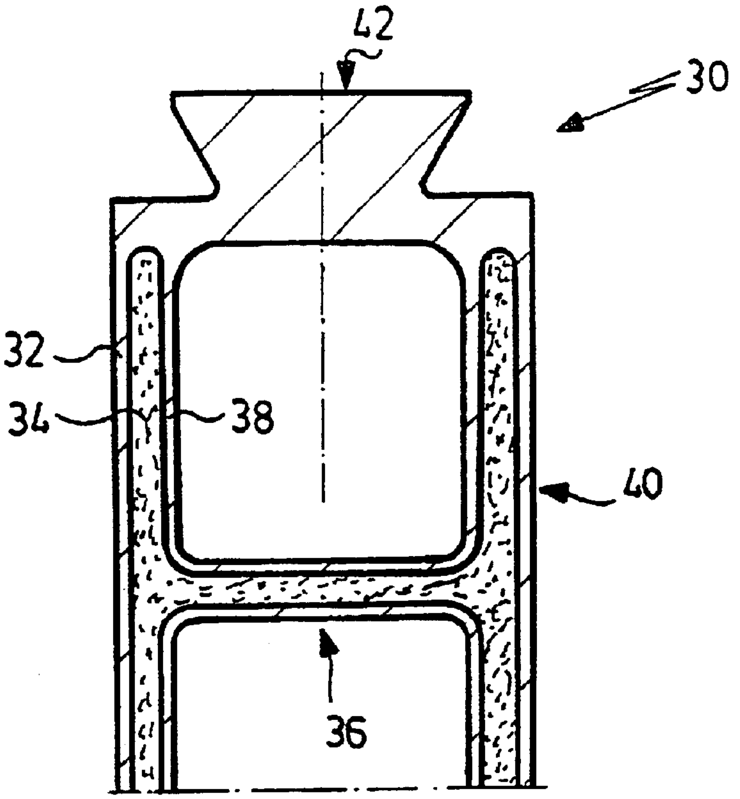
FIG. 3 is a diagrammatic sectional view through a plastics hollow chamber profile of the invention.
Figure 4:
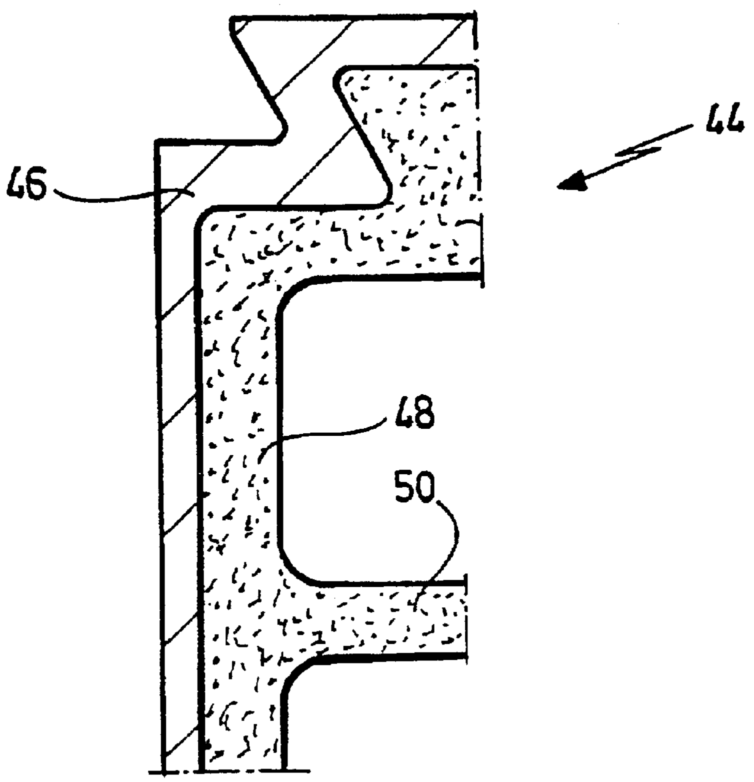
FIG. 4 is a diagrammatic sectional view through another variant of a plastics hollow chamber profile of the invention.

A variant of the hollow chamber profile illustrated in FIG. 3 is shown in the embodiment of FIG. 4, in which the profile 44 is formed by a surface layer 46 of a solid non-porous plastics material and a fine-pored, closed-cell core region 48 which in this case is directly adjacent to the cavity of the hollow profile 44. This cavity is in turn subdivided by an internal web 50, which is composed, in this embodiment, entirely of the material of the core region 48.

Figure 5:
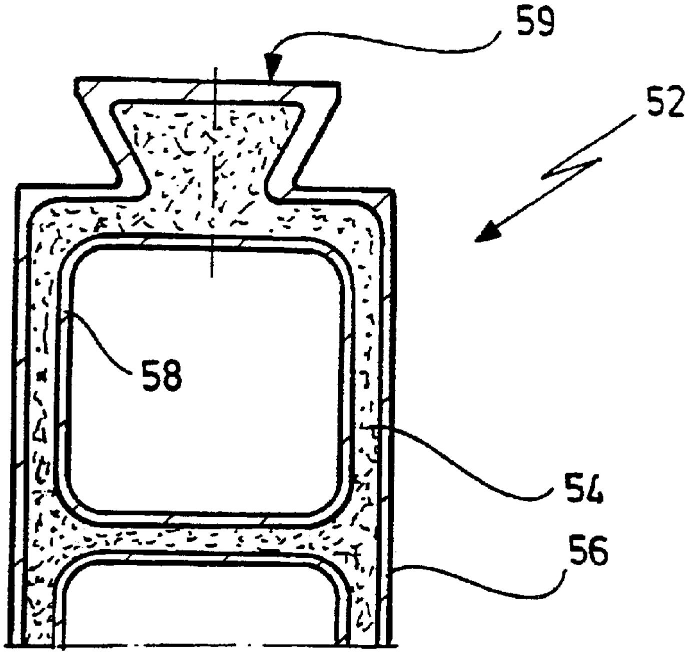
FIG. 5 is a diagrammatic sectional view through a variant of the hollow profile of the invention shown in FIG. 4.

FIG. 5 illustrates a variant of the embodiment of FIG. 4 and depicts a profile 52 of the invention which, like profile 30 of FIG. 3, has a core region 54 enclosed between an outer, solid, non-porous surface layer 56 and an inner, solid surface layer 58. The core region 54 extends, as in FIG. 4, into the region of flange 59. Here again, some regions exhibit sandwich structures, such as are described above with reference to FIG. 3.

Figure 6:
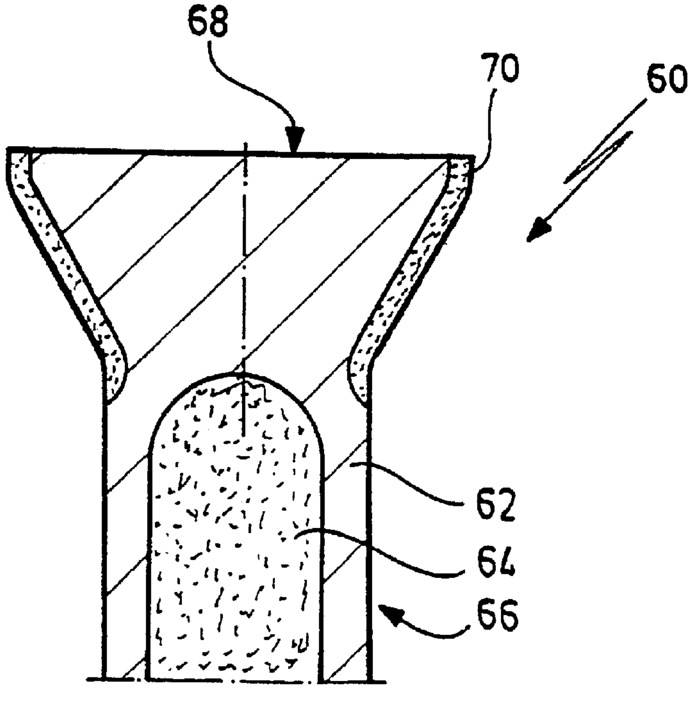
FIG. 6 is a diagrammatic sectional view through a variant of the solid profile of the invention shown in FIG. 2.

FIG. 6 finally shows a profile of the invention 60 having a surface layer 62 and a core region 64, the structure of the profile being divided into a web 66 and a flange 68. In this case, the fine-pored core region does not extend into the region of flange 68. The increased ductility found in some

TABLE II

| | | Example 2 | Example 3 | Example 4 | Comparative Example |
|---|---|---|---|---|---|
| Core region 14 (porous) | | + | + | + | — |
| Thickness $s_1$ | Mm | 1.9 | 1.5 | 1.2 | — |
| Coefficient of thermal conductivity $\lambda_1$ | W/m*K | 0.14 | 0.10 | 0.05 | — |
| Modulus of elasticity $E_1$ | Mpa | 2700 | 2200 | 1500 | — |
| Density $\rho_1$ | g/cm$^3$ | 0.90 | 0.60 | 0.30 | — |
| Surface layer 16 (solid) | | + | + | + | Overall profile |
| Thickness $s_2$ | Mm | 0.30 | 0.50 | 0.65 | 2.00 |
| Coefficient of thermal conductivity $\lambda_2$ | W/m*K | 0.320 | 0.320 | 0.320 | 0.320 |
| Modulus of elasticity $E_2$ | Mpa | 3000 | 3000 | 3000 | 3000 |
| Density $\rho_2$ | g/cm$^3$ | 1.32 | 1.32 | 1.32 | 1.32 |
| Overall profile 10 | | | | | |
| Total thickness | Mm | 2.50 | 2.50 | 2.50 | 2.00 |
| Heat bridge factor s*λ | Mm*W/m*K | 0.46 | 0.47 | 0.48 | 0.64 |
| Coefficient or transverse bending E*I | Mpa*mm$^4$ | 4205 | 4181 | 4190 | 2000 |
| Weight per meter run | g/m | 50.0 | 44.4 | 41.5 | 52.8 |

Figure 2:
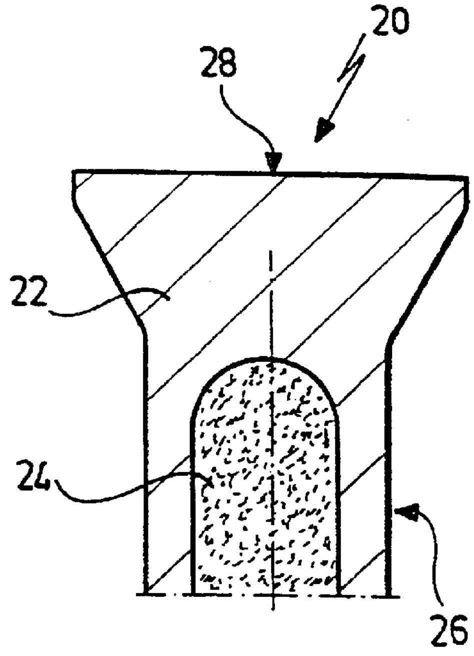
FIG. 2 is a diagrammatic sectional view through another embodiment of a plastics profile of the invention.

FIG. 2 shows a variant of the working example of FIG. 1 and presents a profile 20 having, in addition to a surface layer 22, a fine-pored and closed-cell core region 24. Here again, the profile is of so-called solid material, but in this case the core region, unlike the embodiment of FIG. 1, extends only over the region of the web 26 and does not extent into the flange region 28. The weight reduction observed with this profile is not quite as great as that obtained in FIG. 1, and the improved ductility in the flange region 28, as found in the profile shown in FIG. 1, is absent here.

FIG. 3 shows a plastics hollow chamber profile 30 of the invention having a solid surface layer 32 and a fine-pored, closed-cell core region 34. The cavity of the hollow profile 30 is subdivided by a web 36, into which the core region 34 embodiments (cf, for example, the embodiment shown in FIG. 1) can also be achieved in this variant by providing part of the surface of the surface layer 62 forming part of flange 68 with a fine-pored coating 70. This gives rise to advantages similar to those described with reference to FIG. 1.

What is claimed is:

1. A heat insulated composite profile having an inner and an outer metallic profile, wherein the metallic profiles are interlinked by a solid or hollow plastics profile-comprising a surface layer of a solid, non-porous first plastics material and a core region comprising a fine-pored, closed-cell cellular structure of a second plastics material, the cellular structure in the core region having an average cell size ranging from 0.005 to 0.15 mm, which keeps the inner and outer metal profiles at a specified distance from each other.

2. A profile as defined in claim 1, wherein the profile has a plurality of cavities.

3. A profile as defined in claim 1, wherein the first; and/or second plastics materials contain reinforcing materials, fillers, modifiers and/or additives.

4. A profile as defined in claim 1, wherein the first and second plastics materials are of the same nature.

5. A profile as defined in claim 1, wherein the profile comprises one or more flanges molded therewith, the surface of the one or more flanges are coated with a fine-pored layer at least over certain areas thereof.

6. A profile as defined in claim 1, wherein the average cell diameter of the cellular structure in the core region ranges, on average, from 0.02 to 0.05 mm.

7. A profile as defined in claim 1, wherein the density of the material forming the core region is up to 60% less than that of its base material.

8. A profile as defined in claim 1, wherein the first, and/or second plastics materials comprise a thermoplastic duroplastic, or elastomeric plastics material or a mixture thereof.

9. A profile as defined in claim 1, wherein the surface of the profile is coated completely or in certain areas with primers, adhesive coating compositions, and/or conductive lacquers.

10. Use of a profile as defined in claim 1, as a heat-insulating profile in the production of composite profiles.

11. A heat insulated composite profile having an inner and an outer metallic profile, wherein the metallic profiles are interlinked by a hollow plastics profile, comprising a surface layer of a solid, non-porous first plastics material, a core region comprising a fine-pored, closed-cell cellular structure of a second plastics material, and an inner surface layer of a solid, non-porous third plastics material, defining a hollow chamber, which keeps the inner and outer metal profiles at a specified distance from each other.

12. A profile as defined in claim 11, wherein the core region is completely enclosed by the surface layer and the inner surface layer defining the hollow chambers.

13. A profile as defined in claim 11, wherein the surface layer, the core region, and the inner surface layer together form a sandwich structure in at least some regions of the profile.

14. A profile as defined in claim 11, wherein the profile has a plurality of cavities.

15. A profile as defined in claim 11, wherein the first, second, and/or third plastics materials contain reinforcing materials, fillers, modifiers and/or additives.

16. A profile as defined in claim 11, wherein at least two of the first, second, and third plastics materials are of the same nature.

17. A profile as defined in claim 11, wherein the profile comprises one or more flanges molded therewith, the surface of the one or mare flanges are coated with a fine-pored layer at least over certain areas thereof.

18. A profile as defined in claim 11, wherein the average cell of the cellular structure in the core region ranges, on average, from 0.02 to 0.05 mm.

19. A profile as defined in claim 11 wherein the density of the material forming the core region is up to 60% less than that of its base material.

20. A profile as defined in claim 11, wherein the first, second, and third plastics materials comprise a thermoplastic, duroplastic, or elastomeric plastics material or a mixture thereof.

21. A profile as defined in claim 11, wherein the third plastics material of the inner surface and the first plastics material used in the surface layer are the same.

22. A profile as defined in claim 11, wherein the surface of the profile is coated completely or in certain areas with primers, adhesive coating compositions, and/or conductive lacquers.

23. A method of producing a composite profile comprising the use of a profile as defined in claim 11, as a heat-insulating profile to produce a composite profile.

* * * * *